United States Patent
Barron, Jr. et al.

(10) Patent No.: US 8,407,458 B2
(45) Date of Patent: *Mar. 26, 2013

(54) EMBEDDED DEVICE FOR IMPLEMENTING A BOOT PROCESS ON A HOST

(75) Inventors: Matthew Darrell Barron, Jr., Houston, TX (US); Todd Dalton Grabbe, Sugarland, TX (US)

(73) Assignee: Dell Products, LP, Round Rock, TX (US)

( * ) Notice: Subject to any disclaimer, the term of this patent is extended or adjusted under 35 U.S.C. 154(b) by 540 days.

This patent is subject to a terminal disclaimer.

(21) Appl. No.: 12/630,455

(22) Filed: Dec. 3, 2009

(65) Prior Publication Data

US 2010/0082969 A1    Apr. 1, 2010

Related U.S. Application Data

(63) Continuation of application No. 11/323,738, filed on Dec. 30, 2005, now Pat. No. 7,650,490.

(51) Int. Cl.
*G06F 9/00* (2006.01)
*G06F 9/24* (2006.01)
*G06F 15/177* (2006.01)
*G06F 15/16* (2006.01)

(52) U.S. Cl. ............. 713/2; 713/1; 713/100; 709/203; 709/219; 709/222

(58) Field of Classification Search ............ None
See application file for complete search history.

(56) References Cited

U.S. PATENT DOCUMENTS

| | | | |
|---|---|---|---|
| 5,892,926 A * | 4/1999 | Witkowski et al. | 710/100 |
| 6,453,414 B1 | 9/2002 | Ryu | |
| 6,954,852 B2 | 10/2005 | Burokas et al. | |
| 7,072,946 B2 | 7/2006 | Shafer | |
| 7,114,015 B2 | 9/2006 | Alva et al. | |
| 7,127,603 B2 | 10/2006 | Rangarajan et al. | |
| 7,398,382 B2 * | 7/2008 | Rothman et al. | 713/2 |
| 7,502,134 B2 * | 3/2009 | Aoki | 358/1.15 |
| 7,650,490 B2 * | 1/2010 | Barron et al. | 713/2 |
| 7,991,989 B2 * | 8/2011 | Cherian et al. | 713/2 |
| 2006/0090084 A1 | 4/2006 | Buer | |
| 2007/0050767 A1 | 3/2007 | Grobman et al. | |
| 2007/0083653 A1 | 4/2007 | Chandrasekaran et al. | |

OTHER PUBLICATIONS

Office Action issued in U.S. Appl. No. 11/323,738, mailed Jul. 15, 2008, 10 pgs.
Office Action issued in U.S. Appl. No. 11/323,738, mailed Nov. 12, 2008, 11 pgs.
Office Action issued in U.S. Appl. No. 11/323,738, mailed Mar. 30, 2009, 11 pgs.

* cited by examiner

*Primary Examiner* — Ji H Bae
(74) *Attorney, Agent, or Firm* — Larson Newman, LLP

(57) ABSTRACT

An embedded device, for implementing a boot process on a host, is provided. This embedded device includes servers supporting various industry-standard Internet protocols and services related to the boot process. This embedded device also includes a storage medium that stores boot options for multiple Operating Systems (OSs).

19 Claims, 6 Drawing Sheets

EMBEDDED DEVICE FOR IMPLEMENTING A BOOT PROCESS ON A HOST

RELATED APPLICATIONS

This Application is a continuation of, and claims priority to U.S. patent application Ser. No. 11/323,738, entitled "Embedded Device for Implementing a Boot Process on a Host" filed Dec. 30, 2005, by inventors Matthew Barron and Todd Grabbe, the contents of which are fully incorporated by reference herein.

BACKGROUND

The present invention relates generally to booting of a computer. More specifically, it relates to booting of a computer using Pre-boot eXecution Environment (PXE).

Pre-boot execution Environment is an Intel Wired for Management (WfM) capability that enables a boot of a computer from a server, over a network. A computer that has to be booted is hereinafter referred as a host. To standardize interactions between the host and the server, industry-standard Internet protocols and services, such as Transmission Control Protocol/Internet Protocol (TCP/IP), Dynamic Host Configuration Protocol (DHCP), and Trivial File Transfer Protocol (TFTP), are used.

In existing techniques of booting a host via the PXE, various servers that support the protocols and services related to the PXE are deployed on a network. However, a set up is required to deploy the servers on the network. In addition, it is required that these servers are configured corresponding to an operating system that has to be loaded on the host. However, an improper configuration may lead to an inconsistent boot of the host.

In light of the foregoing discussion, there exists a need for a PXE boot server that is capable of booting a host without a need for any external server and set up on a network. The PXE boot server needs to be capable of booting the host in a consistent manner.

SUMMARY

The present invention provides an embedded device for implementing a boot process on a host. An object of the present invention is to provide a Pre-boot execution Environment (PXE) boot server that is capable of booting the host.

Another object of the present invention is to provide the PXE boot server on an embedded device, which does not require any external server and set up on a network. This minimizes manual intervention required for configuration of external servers on the network.

Yet another object of the present invention is to provide a simple user interface for configuring the PXE boot from remote locations.

In order to achieve the foregoing objectives, and in accordance with the purpose of the various embodiments of the present invention as broadly described herein, the present invention provides an embedded device for implementing a PXE boot on a host to which the embedded device is attached. The embedded device includes servers supporting various industry-standard Internet protocols and services related to the PXE boot. In addition, the embedded device configures the servers on its own, to provide an Operating System (OS) that has to be loaded on the host. Consequently, the embedded device provides a consistent PXE boot process to the host.

Apart from the servers, the embedded device includes a storage medium to store boot options for various OSs. This makes the embedded device capable of providing the complete PXE boot process to the host.

Further, the embedded device includes a user interface for configuring the PXE boot from remote locations. Based on an OS selected by a user, the embedded device configures its servers automatically, thereby providing a simple configuration interface.

BRIEF DESCRIPTION OF THE DRAWINGS

Various embodiments of the present invention will hereinafter be described in conjunction with the appended drawings, provided to illustrate and not to limit the present invention, wherein like designations denote like elements, and in which.

DESCRIPTION OF VARIOUS EMBODIMENTS

Embodiments of the present invention provide an embedded device for implementing a boot process on a host. In the description herein for embodiments of the present invention, numerous specific details are provided, such as examples of components and/or methods, to provide a thorough understanding of embodiments of the present invention. One skilled in the relevant art will recognize, however, that an embodiment of the present invention can be practiced without one or more of the specific details, or with other apparatus, systems, assemblies, methods, components, materials, parts, and/or the like. In other instances, well-known structures, materials, or operations are not specifically shown or described in detail, in order to avoid obscuring aspects of embodiments of the present invention.

Embodiments of the present invention provide an embedded device that is capable of booting a host to which the embedded device is attached. The embedded device includes a microprocessor, a storage medium, and a communication medium. The microprocessor includes servers supporting Internet protocols and services related to the boot process. The storage medium stores boot options corresponding to various OSs. The communication medium provides an interface between the embedded device and the host. The communication medium is connected to a communication bus on the host. In accordance with various embodiments of the present invention, this embedded device is an add-on Peripheral Component Interconnect (PCI) card.

Figure 1:
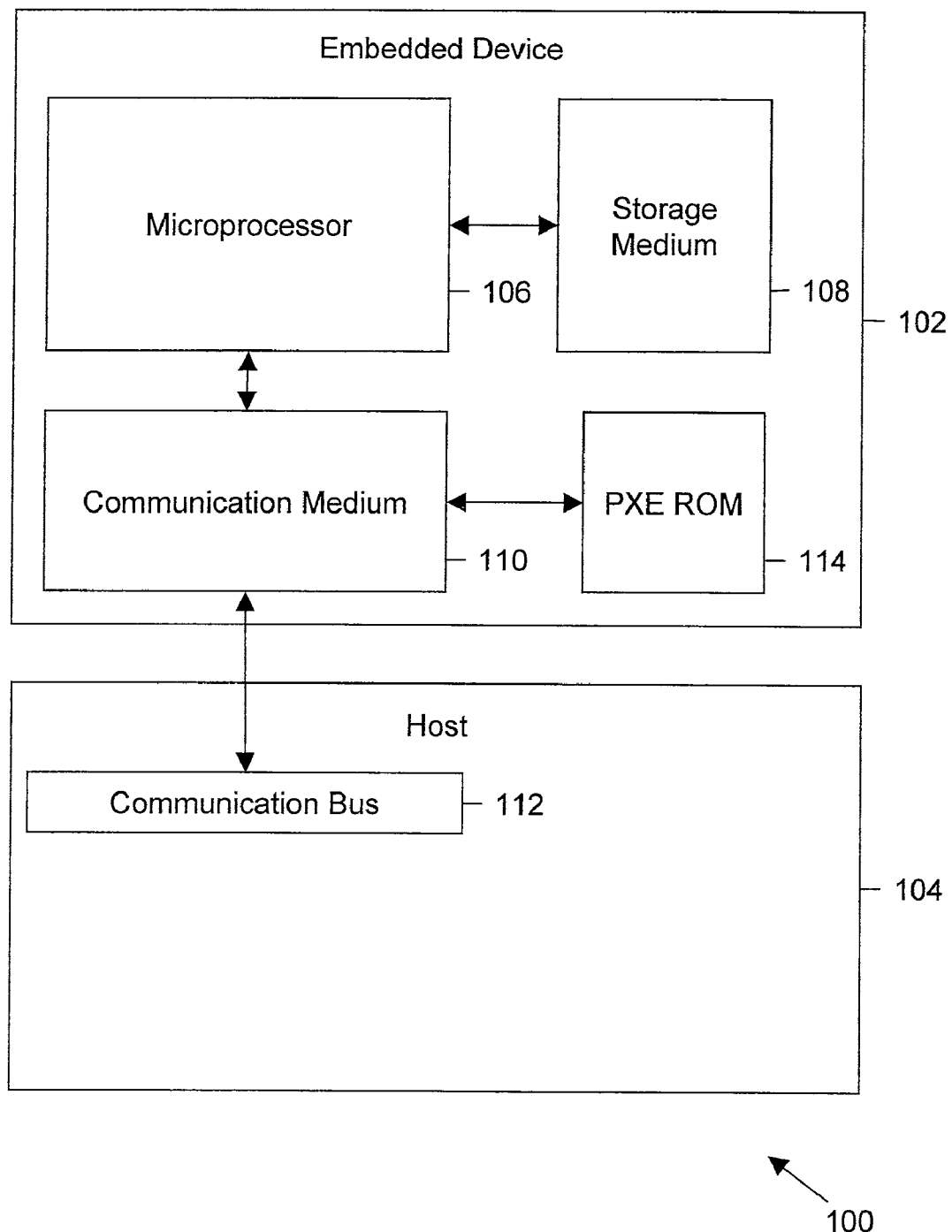
FIG. 1 illustrates various elements of a system for implementing a Pre-boot eXecution Environment (PXE) boot, in accordance with various embodiments of the present invention.

FIG. 1 illustrates various elements of a system 100 for implementing a Pre-boot execution Environment (PXE) boot, in accordance with various embodiments of the present invention. System 100 includes an embedded device 102 and a host 104. In accordance with various embodiments of the present invention, embedded device 102 is attached to host 104. In accordance with an embodiment of the present invention, host 104 is a network device on a network. Network devices may be, for example, personal computers, servers, mobiles, etc.

In accordance with various embodiments of the present invention, embedded device 102 includes a microprocessor 106, a storage medium 108, and a communication medium 110. Microprocessor 106 includes various servers supporting Internet protocols and services related to the PXE boot, such as Dynamic Host Configuration Protocol (DHCP), Trivial File Transfer Protocol (TFTP), Network File System (NFS), and Server Message Block/Common Internet File System (SMB/CIFS). Further, microprocessor 106 is connected to storage medium 108, which includes boot options corresponding to various Operating Systems (OSs). Examples of storage medium 108 include, but are not limited to, a flash memory and a micro drive. Details regarding microprocessor 106 and storage medium 108 have been described in conjunction with FIGS. 2 and 3, respectively.

Further, microprocessor 106 is connected to communication medium 110. Communication medium 110 provides an interface between embedded device 102 and host 104. In accordance with various embodiments of the present invention, communication medium 110 includes an Ethernet controller. Further, embedded device 102 includes a local device driver to provide an interface between the Ethernet controller and a local OS running on microprocessor 106.

In accordance with various embodiments of the present invention, embedded device 102 includes a PXE Read Only Memory (ROM) 114, which is connected to the Ethernet controller. PXE ROM 114 includes a PXE loader to initiate the PXE boot. The PXE loader loads the executable code of PXE program into the memory of host 104, and schedules it for execution.

In accordance with various embodiments of the present invention, embedded device 102 is connected to a communication bus 112, which is included in host 104. Examples of communication bus 112 include, but are not limited to, a PCI bus, a PCI extended (PCI-X) bus, and a PCI Express bus.

Figure 2:
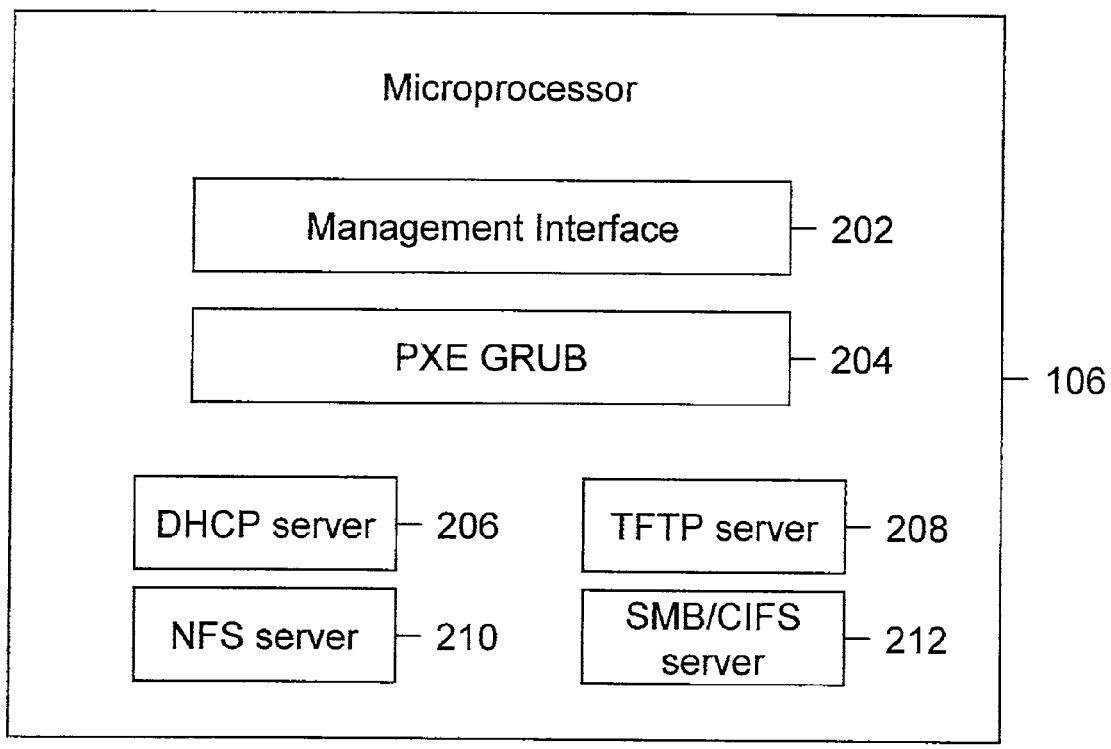
FIG. 2 illustrates various elements of a microprocessor, in accordance with various embodiments of the present invention.

FIG. 2 illustrates various elements of microprocessor 106, in accordance with various embodiments of the present invention. Microprocessor 106 includes a management interface 202, a PXE Grand Unifier Bootloader (GRUB) 204, a DHCP server 206, a TFTP server 208, an NFS server 210, and an SMB/CIFS server 212.

Management interface 202 is used to select an OS to be loaded for booting host 104, in accordance with various embodiments of the present invention. Management interface 202 can include any of the following: a web Application Programming Interface (API), a Secure Shell (SSH) API, and a Hardware Platform Interface (HPI) API.

DHCP server 206 responds to DHCP requests made by host 104 during the PXE boot. The DHCP requests include configuration parameters specific to the PXE boot. These configuration parameters can include an Internet Protocol (IP) address to be used by host 104, an IP address of a TFTP server, the name of a GRUB file, etc. In accordance with various embodiments of the present invention, DHCP server 206 allocates an IP address to host 104 during the PXE boot. In accordance with various embodiments of the present invention, embedded device 102 has an IP address of its own. Once the IP address is assigned to host 104, embedded device 102 specifies itself as the TFTP server. In order to specify itself as the TFTP server, embedded device 102 provides the IP address of its own to host 104 through DHCP protocol, in accordance with various embodiments of the present invention.

Further, TFTP server 208 responds to TFTP requests made by host 104 during the PXE boot. In accordance with various embodiments of the present invention, TFTP server 208 provides PXE GRUB 204 and configuration files corresponding to the selected OS, to host 104. PXE GRUB 204 is a multi-boot bootloader that is capable of loading multiple OSs on host 104.

Network File System server 210 responds to NFS requests made by host 104 during the PXE boot. Similarly, SMB/CIFS server 212 responds to SMB/CIFS requests made by host 104 during the PXE boot. Depending on the OS to be loaded, either NFS server 210 or SMB/CIFS server 212 can provide a Root File System (RFS) to host 104.

In accordance with various embodiments of the present invention, DHCP server 206, TFTP server 208, NFS server 210 and SMB/CIFS server 212, respond to the requests from host 104 through communication medium 110.

Figure 3:
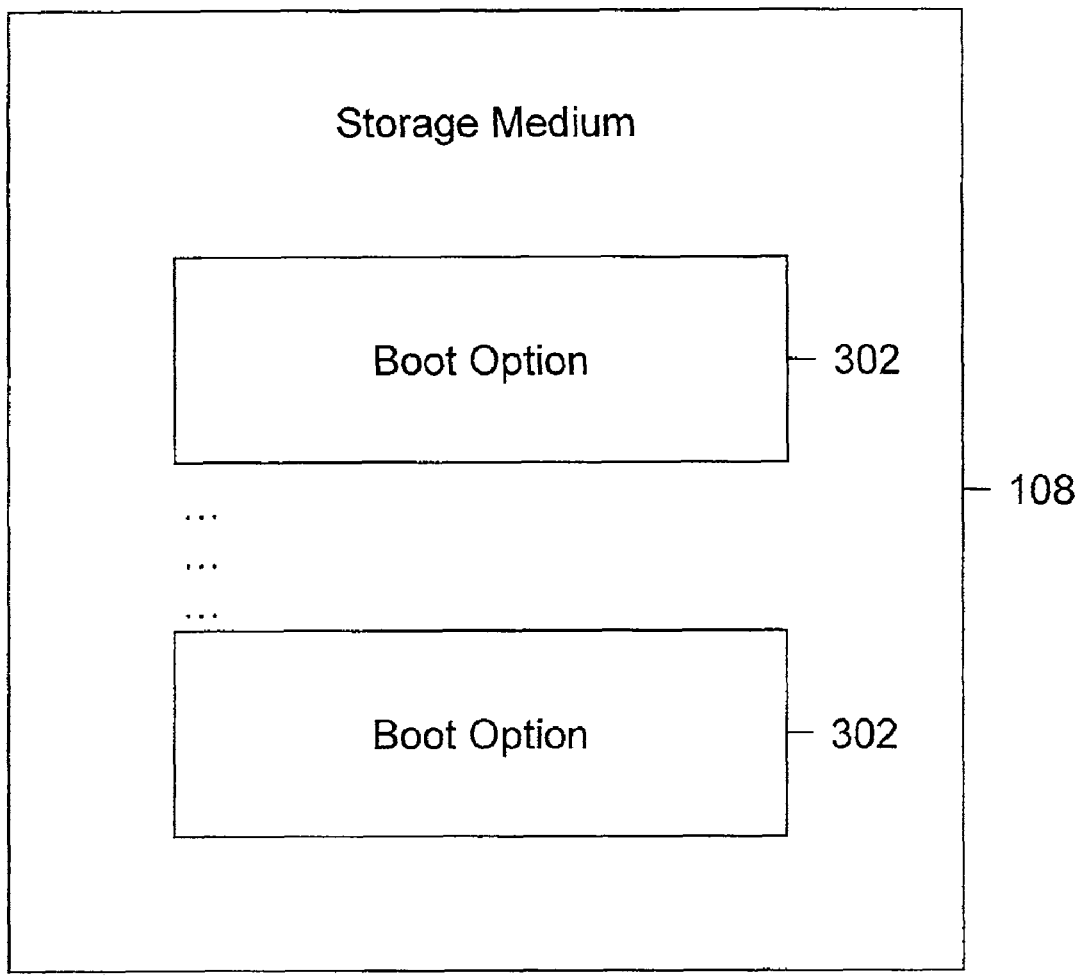
FIG. 3 illustrates a storage medium, in accordance with various embodiments of the present invention.

FIG. 3 illustrates storage medium 108, in accordance with various embodiments of the present invention. Storage medium 108 includes boot options 302 for various OSs. In accordance with various embodiments of the present invention, a boot option from boot options 302 is a boot image of an OS. The boot option includes a kernel corresponding to an OS. A kernel is software that is responsible for providing secure access to a host's hardware and to various applications running on the host. The kernel also provides an interface to the host's hardware. In accordance with an embodiment of the present invention, the boot option includes an init Random Access Memory (RAM) disk that provides a capability to load a RAM disk by PXE GRUB 204. Further, the boot option can include an RFS. An RFS is a table of entries that provides information about a file system of a host.

In accordance with an embodiment of the present invention, embedded device 102 can include an Ethernet connector, which provides a connection to an Ethernet network. Therefore, microprocessor 106 on embedded device 102 can access resources on the Ethernet network during the PXE boot of host 104. In accordance with an embodiment of the present invention, embedded device 102 can act as a network device on the Ethernet network, and can be accessed from remote locations.

Figure 4A:
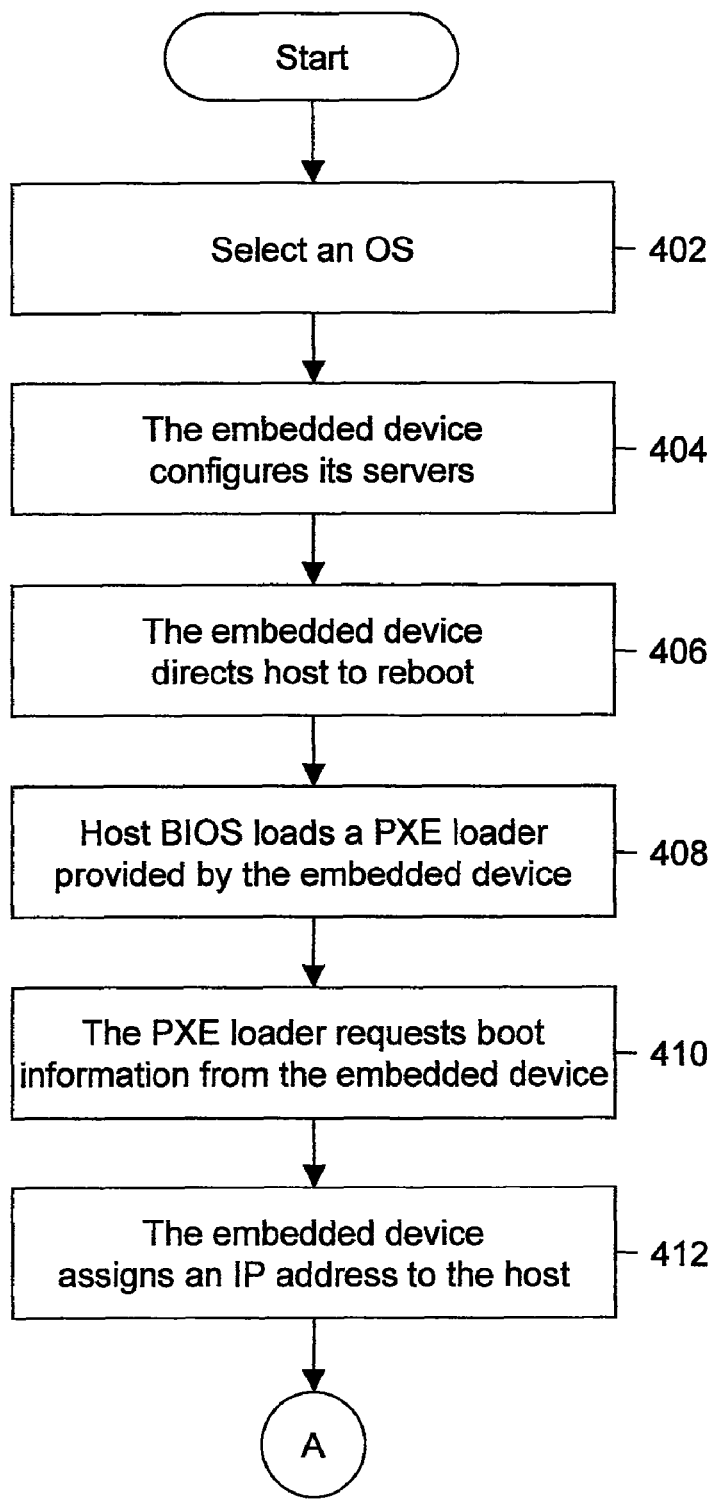
FIGS. 4A, 4B and 4C illustrate a flowchart, implementing the PXE boot on a host, in accordance with an exemplary embodiment of the present invention.
Figure 4B:
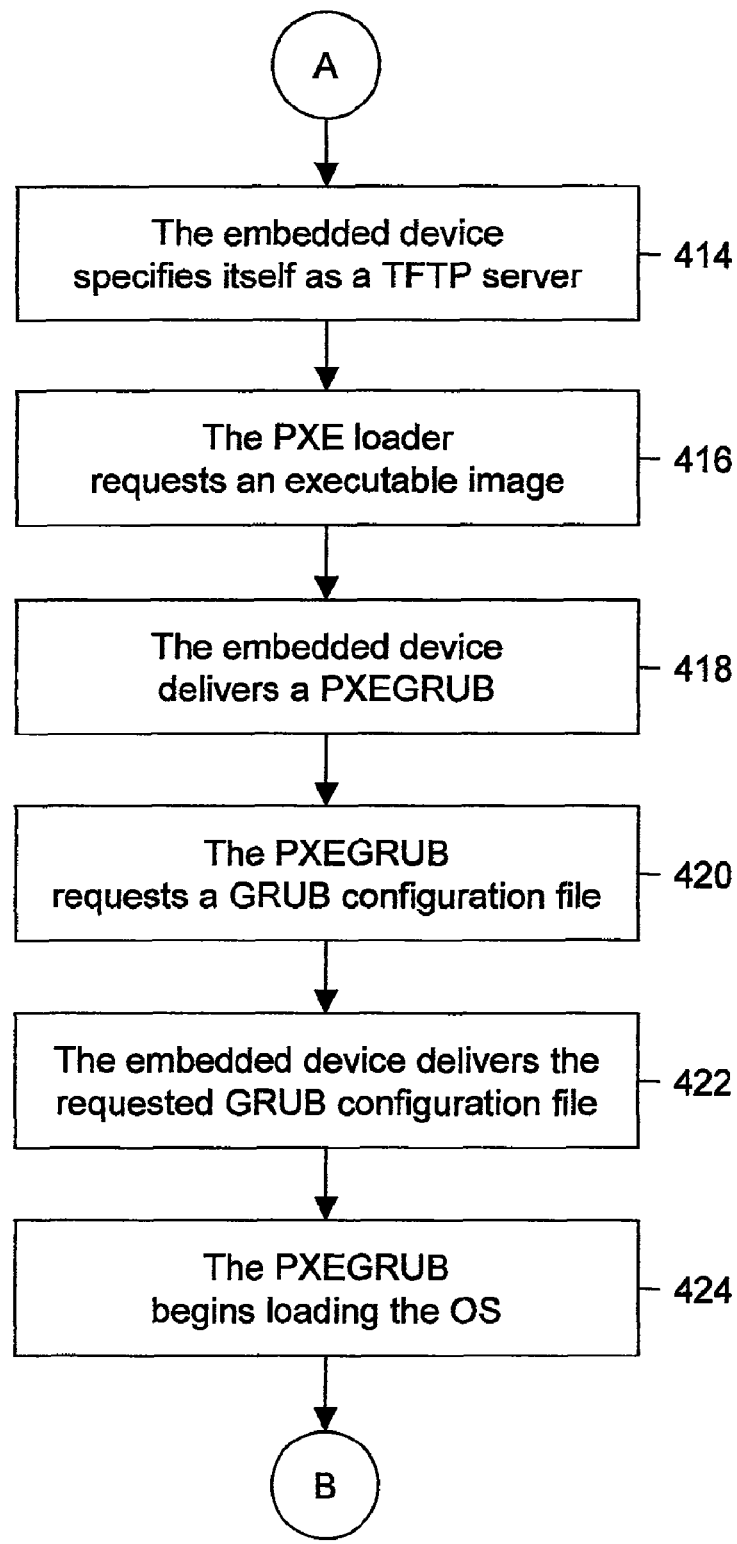
Figure 4C:
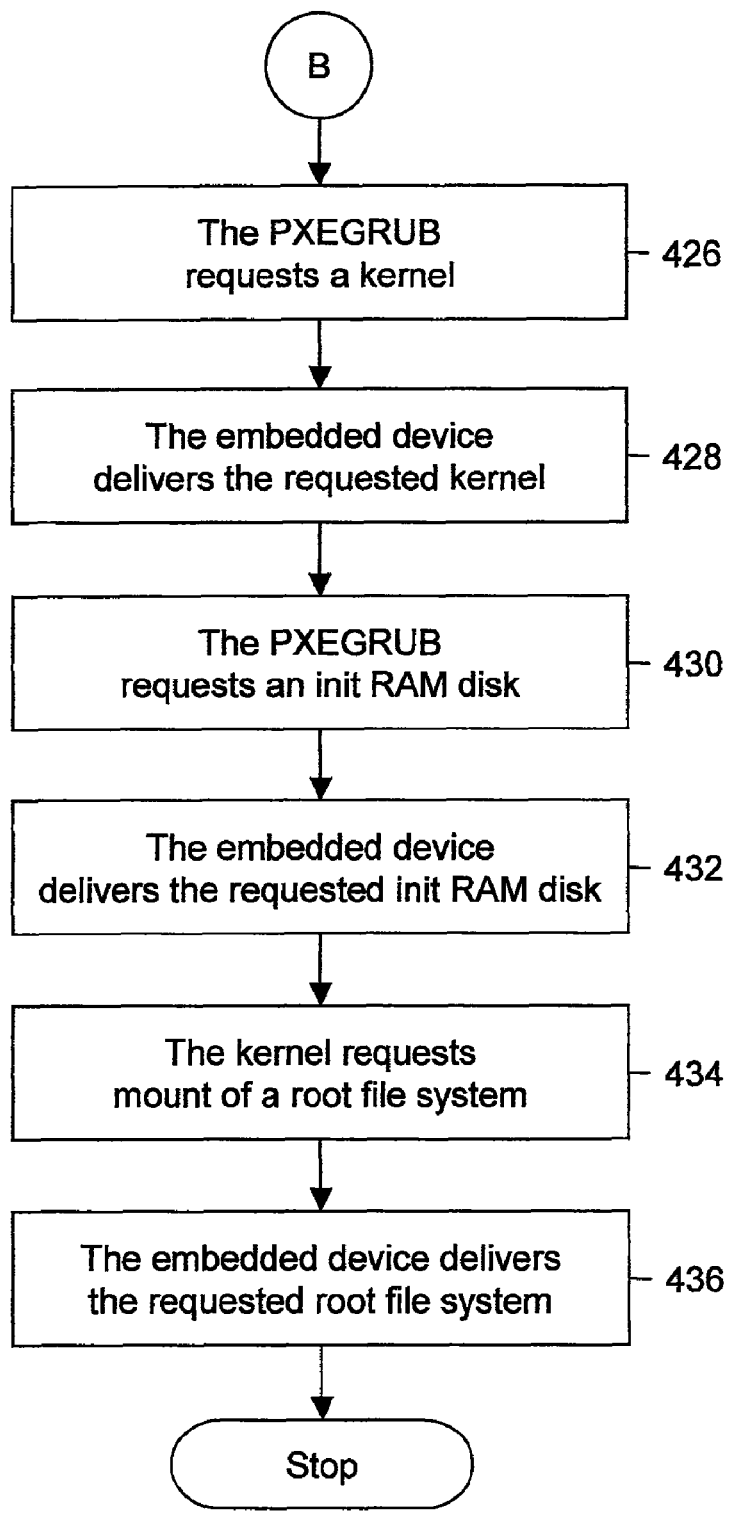

FIGS. 4A, 4B and 4C illustrate a flowchart, implementing the PXE boot on host 104, in accordance with an embodiment of the present invention. At step 402, a user or an external system selects an OS to be loaded on host 104, using management interface 202. In accordance with an embodiment of the present invention, the OS is selected from a set of OSs stored in storage medium 108. In accordance with another embodiment of the present invention, the OS is selected from another set of OSs stored on a storage device of host 104. In accordance with a specific embodiment of the present invention, the OS may be accessed from another host on an Ethernet network. In accordance with various embodiments of the present invention, hardware of host 104 is compatible with the selected OS. In an exemplary embodiment of the present invention, Linux is the selected OS. The following steps 404-436 have been described with reference to Linux as the OS. These steps should not be considered as limited to Linux.

Next, at step 404, embedded device 102 configures DHCP server 206, TFTP server 208 and NFS server 210, to boot host 104 with the OS selected at step 402. At step 406, embedded device 102 directs host 104 to reboot. In accordance with various embodiments of the present invention, embedded device 102 directs host 104 to reboot by power cycling. Once directed, host 104 begins to reboot. Thereafter, at step 408, a Basic Input/Output System (BIOS) of host 104 loads the PXE loader provided by PXE ROM 114, which initiates the PXE boot.

At step 410, the PXE loader requests boot information from embedded device 102. In response to this request, at step 412, embedded device 102 assigns an IP address to host 104, using the DHCP protocol. Thereafter, at step 414, embedded device 102 specifies itself as the TFTP server for the PXE boot. At step 416, the PXE loader requests an executable image from TFTP server 208 on embedded device 102. In response to this request, at step 418, TFTP server 208 delivers PXE GRUB 204 to host 104. Next, at step 420, PXE GRUB 204 requests a GRUB configuration file for the selected OS, from TFTP server 208. In response to this request, at step 422, TFTP server 208 delivers the requested GRUB configuration file. Next, at step 424, PXE GRUB 204 begins loading the selected OS.

At step 426, PXE GRUB 204 requests a kernel of the selected OS. In response to this request, at step 428, TFTP server 208 delivers the requested kernel. Next, at step 430, PXE GRUB 204 requests an init RAM disk for loading the selected OS. In response to this request, at step 432, TFTP server 208 delivers the requested init RAM disk. Once the requested init RAM disk is delivered, the kernel execution begins. At step 434, the kernel requests mount of RFS. In response to this request, at step 436, NFS server 210 delivers the requested RFS. The kernel simultaneously completes the boot sequence. The PXE boot is completed, when the RFS is delivered completely.

Various embodiments of the present invention embed the functionality of an entire PXE boot server into embedded device 102. Embedded device 102 contains servers that support all the protocols related to the PXE boot. Therefore, there is no need to set up external servers. Further, embedded device 102 configures the servers on its own, according to an OS that has to be loaded on host 104. Consequently, embedded device 102 provides a consistent PXE boot process to host 104.

Further, embedded device 102 includes storage medium 108 that stores boot images for multiple OSs. Therefore, it enables a PXE boot even when host 104 has no storage of its own. Further, embedded device 102 can be used to boot a diagnostic program into host 104, if host 104 cannot load its OS due to hardware or software failure. Furthermore, it can be used to install an OS into host 104, if host 104 has a clean hard disk. This makes embedded device 102 capable of providing all the functions of a completely self-sufficient PXE boot server to host 104.

The only requirement is for host 104 to be configured to boot through the PXE protocol. No other special configuration is required for host 104. If host 104 is configured to boot through the PXE protocol, communication to embedded device 102 is established through communication medium 110. Thereafter, embedded device 102 controls the boot sequence completely. Further, embedded device 102 includes DHCP server 206, which is capable of configuring host 104 for the PXE boot.

Moreover, embedded device 102 can be managed from remote locations. Various embodiments of the present invention provide remote reboot and OS selection through a user-friendly management interface 202. Based on an OS selected by a user, embedded device 102 configures its servers automatically, thereby providing a simple configuration interface.

Embedded device 102, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the acts constituting the method of the present invention.

The computer system comprises a computer, an input device, a display unit, the Internet, and a microprocessor. The microprocessor is connected to a communication bus. The computer also comprises a memory, which may include a RAM and a ROM. The computer system also comprises a storage device, which can be a hard disk drive or a removable storage drive, such as a floppy disk drive, an optical disk drive, a flash memory, and so forth. The storage device can also be other similar means for loading computer programs or other instructions into the computer system.

The computer system executes a set of instructions that are stored in one or more storage elements, in order to process input data. These storage elements may also hold data or other information, as desired, and may also be in the form of an information source or a physical memory element in the processing machine.

The set of instructions may include various commands instructing the processing machine to perform specific tasks such as the acts constituting the method of the present invention. The set of instructions may be in the form of a software program, and the software may be in various forms, such as system software or application software. Further, the software may be in the form of a collection of separate programs, a program module with a larger program, or a portion of a program module. The software may also include modular programming in the form of object-oriented programming. The processing of input data by the processing machine may be in response to user commands, to results of previous processing, or in response to a request made by another processing machine.

While various embodiments of the present invention have been illustrated and described, it will be clear that the present invention is not limited only to these embodiments. Numerous modifications, changes, variations, substitutions and equivalents will be apparent to those skilled in the art, without departing from the spirit and scope of the present invention, as described in the claims.

The invention claimed is:

1. An embedded device for booting a host, the host having a first microprocessor, a first storage medium and a communication bus, the embedded device comprising:
    a second microprocessor on the embedded device distinct from the first microprocessor, the second microprocessor having access to one or more servers on the embedded device, each of the one or more servers supporting at least one protocol related to a PXE boot;
    a second storage medium on the embedded device, storing one or more boot options, each of the one or more boot options being related to an Operating System (OS); and
    an interface physically coupled to the communication bus on the host, wherein the embedded device is operable to PXE boot the host without utilizing the first storage medium of the host by communicating with the host through the interface, including, during the PXE boot, receiving one or more requests from the host through the interface and responding to the one or more requests through the interface using the one or more servers on the embedded device and one or more boot options on the second storage medium on the embedded device.

2. The embedded device of claim 1, wherein the second microprocessor further comprises a management interface, the management interface being provided for configuring the embedded device.

3. The embedded device of claim 2, wherein the management interface comprises at least one of a web Application Programming Interface (API), a Secure Shell (SSH) API, and a Hardware Platform Interface (HPI) API and the management interface can be used to select an OS to be loaded for booting the host.

4. The embedded device of claim 1 further comprising a PXE Read Only Memory (ROM), wherein the PXE ROM comprises a PXE loader, the PXE loader initiating the PXE boot on the host on being provided to the host through the interface.

5. The embedded device of claim 1, wherein the embedded device comprises an Ethernet controller.

6. The embedded device of claim 5, further comprising a local device driver, the local device driver interfacing the Ethernet controller to a local OS running on the second microprocessor.

7. The embedded device of claim 1, wherein the second microprocessor further comprises a PXE GRand Unified Bootloader (GRUB), the PXE GRUB being provided to the host through the communication medium, the PXE GRUB loading a selected OS on the host.

8. The embedded device of claim 1, wherein the one or more servers comprise a Dynamic Host Configuration Protocol (DHCP) server, the DHCP server responding to one or more DHCP requests through the interface, the one or more DHCP requests being requested by the host; a Trivial File Transfer Protocol (TFTP) server, the TFTP server responding to one or more TFTP requests through the interface, the one or more TFTP requests being requested by the host; a Network File System (NFS) server, the NFS server responding to one or more NFS requests through the interface, the one or more NFS requests being requested by the host; or a Server Message Block/Common Internet File System (SMB/CIFS) server, the SMB/CIFS server responding to one or more SMB/CIFS requests through the interface, the one or more SMB/CIFS requests being requested by the host.

9. The embedded device of claim 1, wherein the one or more boot options comprises one or more boot images of an OS or a kernel, an initial Random Access Memory (RAM) disk, and a Root File System (RFS), of an OS.

10. The embedded device of claim 1, wherein the PXE boot of the host is initiated from a remote location.

11. A method for booting a host having a first microprocessor, a first storage medium and a communication bus utilizing an embedded device, comprising:
receiving one or more requests from the host at the embedded device through an interface of the embedded device physically coupled to the communication bus on the host, wherein the one or more requests are associated with a PXE boot of the host; and
responding to the one or more requests associated with the PXE boot through the interface using one or more servers on the embedded device supporting at least one protocol related to a PXE boot and one or more boot options related to an Operating System (OS), wherein responding to the one or more requests comprises accessing a second microprocessor on the embedded device distinct from the first microprocessor, the second microprocessor having access to the one or more servers on the embedded device and accessing a second storage medium on the embedded device storing the one or more boot options.

12. The method of claim 11, further comprising configuring the embedded device using a management interface provided by the second microprocessor.

13. The method of claim 12, wherein the management interface comprises at least one of a web Application Programming Interface (API), a Secure Shell (SSH) API, and a Hardware Platform Interface (HPI) API and the management interface can be used to select an OS to be loaded for booting the host.

14. The method of claim 11, further comprising initiating the PXE boot on the host using PXE loader on a PXE Read Only Memory (ROM) on the embedded device.

15. The method of claim 11, wherein an Ethernet controller on the embedded device is interfaced to a local OS running on the second microprocessor.

16. The method of claim 11, further comprising loading a selected OS on the host using a PXE GRand Unified Bootloader (GRUB) being provided form the second microprocessor to the host through the interface.

17. The method of claim 11, wherein the one or more servers comprise a Dynamic Host Configuration Protocol (DHCP) server, the DHCP server responding to one or more DHCP requests through the interface, the one or more DHCP requests being requested by the host; a Trivial File Transfer Protocol (TFTP) server, the TFTP server responding to one or more TFTP requests through the interface, the one or more TFTP requests being requested by the host; a Network File System (NFS) server, the NFS server responding to one or more NFS requests through the interface, the one or more NFS requests being requested by the host; or a Server Message Block/Common Internet File System (SMB/CIFS) server, the SMB/CIFS server responding to one or more SMB/CIFS requests through the interface, the one or more SMB/CIFS requests being requested by the host.

18. The method of claim 11, wherein the one or more boot options comprises one or more boot images of an OS or a kernel, an initial Random Access Memory (RAM) disk, and a Root File System (RFS), of an OS.

19. The method of claim 11, further comprising initiating the PXE boot of the host from a remote location.

* * * * *